US010150344B2

(12) United States Patent
Larsson et al.

(10) Patent No.: US 10,150,344 B2
(45) Date of Patent: Dec. 11, 2018

(54) CONTROL ARM MOUNT

(71) Applicant: Ningbo Geely Automobile Research & Development Co., Ltd., Ningbo (CN)

(72) Inventors: Martin Larsson, Trollhättan (SE); Martin Svensson, Kullavik (SE); Roger Karlsson, Torslanda (SE)

(73) Assignee: Ningbo Geely Automobile Research & Development Co., Ltd., Ningbo (CN)

( * ) Notice: Subject to any disclaimer, the term of this patent is extended or adjusted under 35 U.S.C. 154(b) by 0 days.

(21) Appl. No.: 15/706,468

(22) Filed: Sep. 15, 2017

(65) Prior Publication Data
US 2018/0056744 A1    Mar. 1, 2018

Related U.S. Application Data

(63) Continuation of application No. PCT/SE2016/050217, filed on Mar. 17, 2016.

(30) Foreign Application Priority Data

Mar. 17, 2015  (SE) ...................................... 1550322

(51) Int. Cl.
*B60G 3/06*  (2006.01)
*B60G 7/02*  (2006.01)
*B62D 21/15*  (2006.01)

(52) U.S. Cl.
CPC ................. *B60G 7/02* (2013.01); *B60G 3/06* (2013.01); *B62D 21/155* (2013.01);
(Continued)

(58) Field of Classification Search
CPC ............... B60G 7/02; B60G 2204/143; B60G 2204/1431; B60G 2204/4302;
(Continued)

(56) References Cited

U.S. PATENT DOCUMENTS 6,705,627 B2 *  3/2004  Hasebe ................... B60G 7/02
                                                280/124.134
7,562,886 B2 *  7/2009  Takeda ................ B62D 21/155
                                                     180/232
7,571,917 B2 *  8/2009  Ruehe .................... B60G 7/001
                                                     180/274
(Continued)

FOREIGN PATENT DOCUMENTS

JP    XY2014008938 A    1/2014
WO   WO2014127936 A1    8/2014

OTHER PUBLICATIONS

The PCT Search Report and Written Opinion dated Jun. 14, 2016 for PCT Application No. PCT/SE2016/05217, 10 pages.
A Sweden Office Action dated Nov. 27, 2015 for Sweden patent application No. 155322.0.
Notification of Transmittal of the International Preliminary Report of Patentability for PCT/SE2016/050217 dated Mar. 2, 2017, 16 pages.

*Primary Examiner* — Laura Freedman
(74) *Attorney, Agent, or Firm* — Lee & Hayes, PC

(57) ABSTRACT

An arrangement for attaching a control arm in a vehicle comprising a first attachment bracket, a first fastening means, a first bushing, and a control arm. The first bushing is arranged in an opening of the control arm and the first fastening means is passing through both the first attachment portion and the first bushing. The first attachment bracket comprises a slit arranged transversal to the travel direction of the vehicle and the slit is arranged in a front surface of the first attachment bracket, wherein the first attachment bracket is adapted to release the first fastening means of said control arm when a certain force is exceeded during an offset or small offset impact.

15 Claims, 17 Drawing Sheets

(52) U.S. Cl.
CPC ............... *B60G 2200/1424* (2013.01); *B60G 2200/154* (2013.01); *B60G 2200/156* (2013.01); *B60G 2204/143* (2013.01); *B60G 2204/1431* (2013.01); *B60G 2204/4302* (2013.01); *B60G 2206/016* (2013.01); *B60G 2206/12* (2013.01); *B60G 2206/122* (2013.01)

(58) Field of Classification Search
CPC .......... B60G 2206/016; B60G 2206/12; B60G 2206/122; B60G 3/06; B60G 2200/1424; B60G 2200/154; B60G 2200/156; B62D 21/11; B62D 21/155
See application file for complete search history.

(56) References Cited

U.S. PATENT DOCUMENTS

| | | | |
|---|---|---|---|
| 8,870,205 B2 * | 10/2014 | Corby | B60G 3/06 |
| | | | 180/274 |
| 8,985,258 B1 * | 3/2015 | Midoun | B62D 25/082 |
| | | | 180/274 |
| 9,561,700 B2 * | 2/2017 | Kraschienski | B60G 7/02 |
| 9,592,854 B2 * | 3/2017 | Ishii | B62D 21/155 |
| 9,623,712 B2 * | 4/2017 | Sakaguchi | B60G 7/001 |
| 2003/0090099 A1 | 5/2003 | Miyasaka | |

* cited by examiner

CONTROL ARM MOUNT

RELATED APPLICATION

This application is a continuation of PCT International Application No. PCT/SE2016/050217, filed Mar. 17, 2016, which claims foreign priority to Sweden Application No. 1550322-0, filed on Mar. 17, 2015, both of which are incorporated herein by reference.

TECHNICAL FIELD

The present invention relates generally to an arrangement for attaching a control arm to a vehicle.

BACKGROUND ART

Arrangements for attaching control arms in vehicles are generally adapted to connect the control arm of a vehicle to the rest of the vehicle creating a connection between the wheel suspension and the vehicle body. There are multiple solutions available in prior art with the most common solution being a control arm arranged to a sub-frame that serves the purpose of supporting the engine. Each vehicle generally comprises one control arm per front wheel. The control arm is a hinged suspension link and serves as a link between the subframe, or the chassis, and the suspension for a wheel.

Control arms are most commonly arranged in front suspension arrangements, such as MacPhearson strut independent front suspensions, but are also arranged in rear suspensions of some vehicles. In general, control arms are adapted to improve comfort, create adequate suspension, and provide a solution with sufficient structural strength to withstand forces during normal operation. Those solutions are well known to the person skilled in the art.

The structural strength of arrangements for attaching control arms to vehicles has to be sufficient to withstand stress and forces during normal operation but the same structural strength creates problems during collisions. For example, most components arranged in the front of a vehicle are during a frontal crash pressed backwards towards the passenger cell. Therefore are many of those components collapsible in order to absorb energy and prevent them from being pushed into the passenger cell. The control arm is required to have strength to withstand forces from driving into potholes, hitting sidewalk edges, and other forces that are applied to the wheel and front suspension of a vehicle which makes it difficult to deform or collapse during a crash. The same problem exists for the front wheels as well as the engine. It is thereby a common risk that both the control arm and the wheel attached thereto is pushed backwards towards the passenger cell during a frontal collision, especially if the collision is a so called small offset collision.

Thus it would be advantageous to provide a solution wherein the structural strength is maintained without the drawbacks of the prior art solutions, especially to improve the safety for passengers of the vehicle during a crash.

SUMMARY OF INVENTION

An object of the present invention is to improve the safety for the passenger of a vehicle during front collisions, especially small offset collisions. Another object of the arrangement for attaching a control arm in a vehicle is to create a structure that during a front collision directs the front wheels of the vehicle in a projection path passing outside of the passenger cell. Yet another object of the present invention is to provide an attachment arrangement for a control arm with both sufficient structural strength and improved safety during small offset collisions.

This is achieved through directing the front wheels of a vehicle outside of a passenger cell, and/or the perimeters of a vehicle body, in order to decrease the risk of the front wheel causing additional damage to the vehicle and especially the passengers within. Simultaneously the control arm is rotated and forced out of the area it creates harm to. The front wheel helps force the control arm out from the area it creates harm to.

Thus the invention relates to an arrangement for attaching a control arm in a vehicle, wherein said arrangement comprises a first attachment bracket, a first fastening means, and a first bushing. The first bushing is arranged in an opening in the control arm and the first fastening means is passing through both the first attachment bracket and the first bushing. The first attachment bracket comprise a slit arranged transversal to the travel direction of the vehicle and the slit is arranged in a first surface of the first attachment bracket, wherein the first attachment bracket is adapted to release the first fastening means of said control arm when a predetermined force is exceeded during an offset impact.

It is one advantage with the arrangement for attaching a control arm in a vehicle, such as a car, that the arrangement is adapted to release a first fastening means of the control arm allowing a front wheel to be directed in a projection path outside of a passenger cell of said vehicle. It is another advantage with the arrangement for attaching a control arm in a vehicle that the first attachment bracket comprises two surfaces, a first and second, wherein the first surface is adapted to host the first fastening means while the second surface is adapted to secure said first fastening means in a fixed engagement, such as a threaded engagement.

It is one advantage that the fixed engagement to the second surface retains the first fastening means longer than the first surface retains the first fastening means. This enables the first fastening means to shear in a controlled way.

According to an embodiment of the arrangement for attaching a control arm in a vehicle is the first attachment bracket part of a vehicle sub-frame.

It is one advantage of the arrangement for attaching a control arm in a vehicle that the first attachment bracket is part of a vehicle sub-frame. The subframe is attached to the chassis of said vehicle and provides a rigid structure to attach, or integrate, the first attachment bracket to. The sub-frame has a high structural strength ensuring that the arrangement detaches the first fastening means in the intended way.

The person skilled in the art understands that in different embodiments of the arrangement for attaching a control arm in a vehicle might the first and second attachment brackets be attached to, or part of, different parts of the vehicle. However, in a preferred embodiment are both part of the sub-frame.

According to an embodiment of the arrangement for attaching a control arm in a vehicle, the arrangement further comprises a second attachment bracket, a second fastening means, and a second bushing.

In one embodiment of the arrangement for attaching a control arm in a vehicle is the second attachment bracket arranged substantially in the rear portion of the sub-frame and adapted to host a rear portion of the control arm. The control arm is in a preferred embodiment shaped as an A-arm. The second fastening means is adapted to be arranged within the second bushing passing through the control arm and attaching said control arm to the second attachment bracket.

According to an embodiment of the arrangement for attaching a control arm in a vehicle is the second attachment bracket adapted to retain a rear portion of the control arm in said second attachment bracket during a small offset impact.

The second attachment bracket is substantially different from the first attachment bracket in that the second attachment bracket is designed to retain the rear portion of the control arm in position during a collision. It is an advantage of the present solution that the control arm is released from its front (first) fastening means while retained in its rear (second) fastening means in order to create a rotation in the second attachment bracket wherein the control arm in a preferred embodiment rotates around a rotation axis centered in the center of the second attachment means.

According to an embodiment of the arrangement for attaching a control arm in a vehicle is the first attachment bracket adapted to release the engagement of the first fastening means at a collision force substantially lower than the collision force required for the second attachment bracket to release the second fastening means.

It is one advantage of the arrangement for attaching a control arm in a vehicle that the first attachment bracket is adapted to release the engagement of the first fastening means at a force substantially lower than the collision force that would release the second fastening means from the second attachment bracket. In an embodiment of the solution is the rear fastening means adapted to retain the rear portion of the control arm independent on the force that it is subject to. The second attachment bracket is further adapted to through means of, for example, the second fastening means enable rotation of the control arm.

In one embodiment is the second attachment bracket adapted to release the control arm totally and thereby allowing it, and the front wheel therewith, to decouple from the vehicle once the maximum rotation angle of the second attachment bracket has been achieved. The maximum rotation angle is the angle wherein the force applied to the control arm during an impact is linear with the imagined line between the attachment point to the wheel and the attachment point to the second attachment bracket.

According to an embodiment of the arrangement for attaching a control arm in a vehicle are said first and second fastening means chosen from a bolt, screw, rivet, pin, and peg.

According to an embodiment of the arrangement for attaching a control arm in a vehicle, the first attachment bracket further comprises a second surface substantially parallel to said first surface, the first fastening means is arranged within an aperture adjacent to said slit of the first surface and in fixed engagement with an engagement means of said second surface.

According to an embodiment of the arrangement for attaching a control arm is said first fastening means adapted to shred in the close vicinity of the second surface during the exerted force of a small offset collision.

According to an embodiment of the arrangement for attaching a control arm in a vehicle is the first attachment bracket arranged as part of a front portion of a vehicle sub-frame.

According to an embodiment of the arrangement for attaching a control arm in a vehicle is the second attachment bracket arranged as part of a rear portion of a vehicle sub-frame.

According to an embodiment of the arrangement for attaching a control arm in a vehicle is the second attachment bracket arranged as part of the vehicle sub-frame at a position further back in relation to a traveling direction of said vehicle than the first attachment bracket.

According to an aspect of directing a vehicle front wheel outside of a passenger cell during a small offset collision wherein a control arm is attached through means of the arrangement for attaching a control arm in a vehicle, and the following steps are performed:

releasing said control arm from the first attachment bracket at a predetermined first force of a small offset collision, and releasing said control arm from the first attachment bracket at a predetermined first force of a small offset collision, and retain the attachment of the control arm to the second attachment bracket allowing the front wheel to be twisted outside of said passenger cell.

According to an embodiment of directing a vehicle front wheel outside of a passenger cell during a small offset collision is the control arm rotated around the central axis of the second fastening means in the second attachment bracket during a small offset collision.

According to an embodiment of directing a vehicle front wheel outside of a passenger cell during an offset collision is the attachment of the control arm to the second attachment bracket allowing the front wheel to be rotated outside of said passenger cell.

Wherein the term small offset collision, small offset impact, or offset collision is referred to herein it is understood that the solution serves a purpose for any form of head-on collision. Furthermore, the words small offset impact and small offset collision shall be interpreted as interchangeable. Brief description of drawings The invention is now described, by way of example, with reference to the accompanying drawings, in which.

DESCRIPTION OF EMBODIMENTS

In the following, a detailed description of different embodiments of the arrangement for attaching a control arm in a vehicle is disclosed under reference to the accompanying drawings. All examples herein should be seen as part of the general description and are therefore possible to combine in any way of general terms. Individual features of the various embodiments and aspects may be combined or exchanged unless such combination or exchange is clearly contradictory to the overall function of the disclosed arrangement.

Briefly described the invention relates to an arrangement for attaching a control arm in a vehicle providing a solution that during a frontal collision directs the front wheels of said vehicle in a projection path outside of the passenger cell of the vehicle. The benefit with such a solution is that the risks for injuries within the passenger cell is decreased if less material is pushed towards and into the passenger cell.

Figure 1:
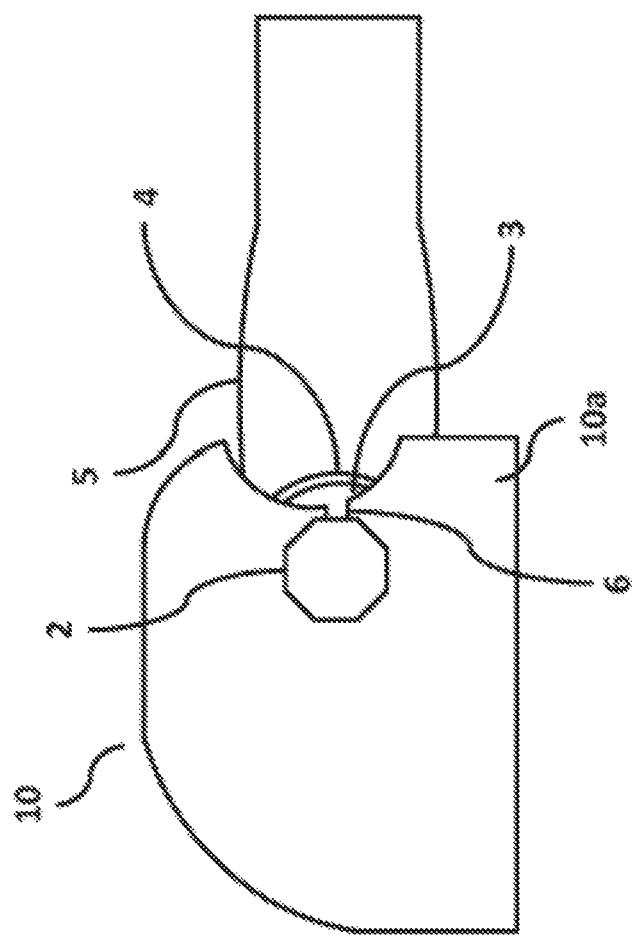
FIG. 1 illustrates one embodiment of the first attachment bracket in the arrangement for attaching a control arm in a vehicle.

FIG. 1 illustrates one embodiment of the first attachment bracket 10 in the arrangement 1 for attaching the control arm 5 in a vehicle. The control arm 5 is placed between a first surface 10a and a second surface 10b of the attachment bracket 10. The first surface 10a is preferably arranged further towards the front of the vehicle than the second surface 10b. The control arm 5 comprises an aperture 4 wherein for example a rubber bushing 3 or any other form of means adapted to minimize vibrations is arranged. The rubber bushing 3 is adapted to allow movement of the control arm 5 upwards and downwards by means of movement from the vehicle suspension. The arrangement further comprises at least a first fastening means 2 that for example could be a bolt, pin, or any other fastening means 2.

FIG. 1 further illustrates the slit 6 arranged on the first surface 10a. The slit 6 is arranged in a direction transverse to the vehicle's direction of travel and is adapted to release the first fastening means 2 in the event of a small offset collision. The slit 6 is arranged in the transverse direction to the vehicle's direction of travel in order to only release the first fastening means 2 in the event of a collision. The person skilled in the art understands that releasing the control arm 5 is also beneficial during a normal front collision in order to direct the front wheels 33 outside of the passenger cell 152.

Figure 2:
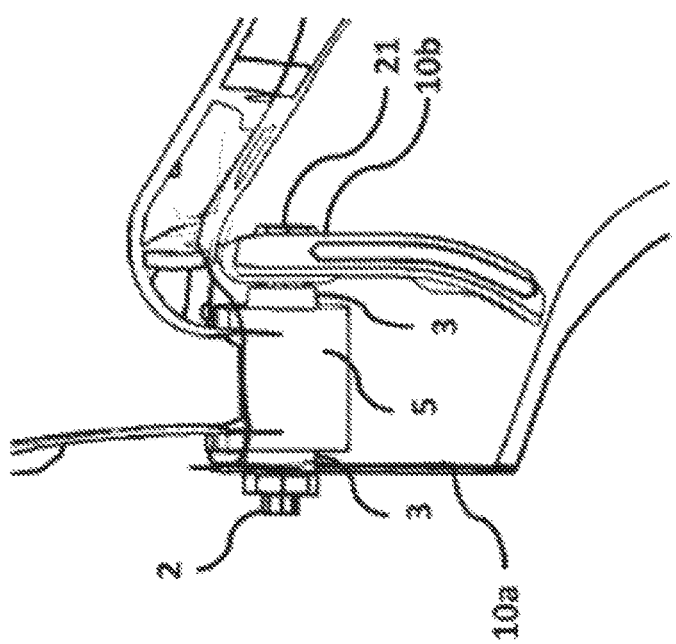
FIG. 2 illustrates another view of an embodiment of the first attachment bracket wherein the second attachment bracket in the arrangement for attaching a control arm in a vehicle is visible.

FIG. 2 illustrates another view of the arrangement for attaching the control arm 5 in a vehicle wherein the attachment bracket 10 is seen from the transversal direction of the vehicle's travel direction, i.e. from the side of the vehicle. The first surface 10a and second surface 10b are, as illustrated, parallel and the control arm 5 is adapted to be arranged between said first 10a and second 10b surfaces. The first fastening means 2 is in a preferred embodiment a through-going fastening means extending beyond both the first 10a and second 10b surfaces. The first fastening means 2 can be any form of fastening means such as a pin, bolt, rivet, or any other form of suitable fastening means 2. At the first surface 10a is the first fastening means 2 preferably secured through for example the end of a rivet or the head of a bolt. The first surface 10a is adapted to host the first fastening means 2 and secure it through disabling movement in any direction at normal operation forces. However, no fixed engagement, such as a threaded engagement is preferably arranged in relation to the first surface 10a. At the second surface 10b is the first fastening means 2 secured through an engagement means 21. The engagement means 21 can be any form of engagement means, such as the end of a rivet, a nut, a nut welded to the second surface 10b, or any other form of engagement means 21, preferably a threaded engagement means 21. In a preferred embodiment is the first fastening means 2 a bolt entered through the first surface 10a, extending thorough the rubber bushing 3 arranged in the aperture 4 of the control arm 5, and further extending through the second surface 10b entered into fixed engagement with the engagement means 21 that preferably is a nut welded to the second surface 10b.

Figure 3:
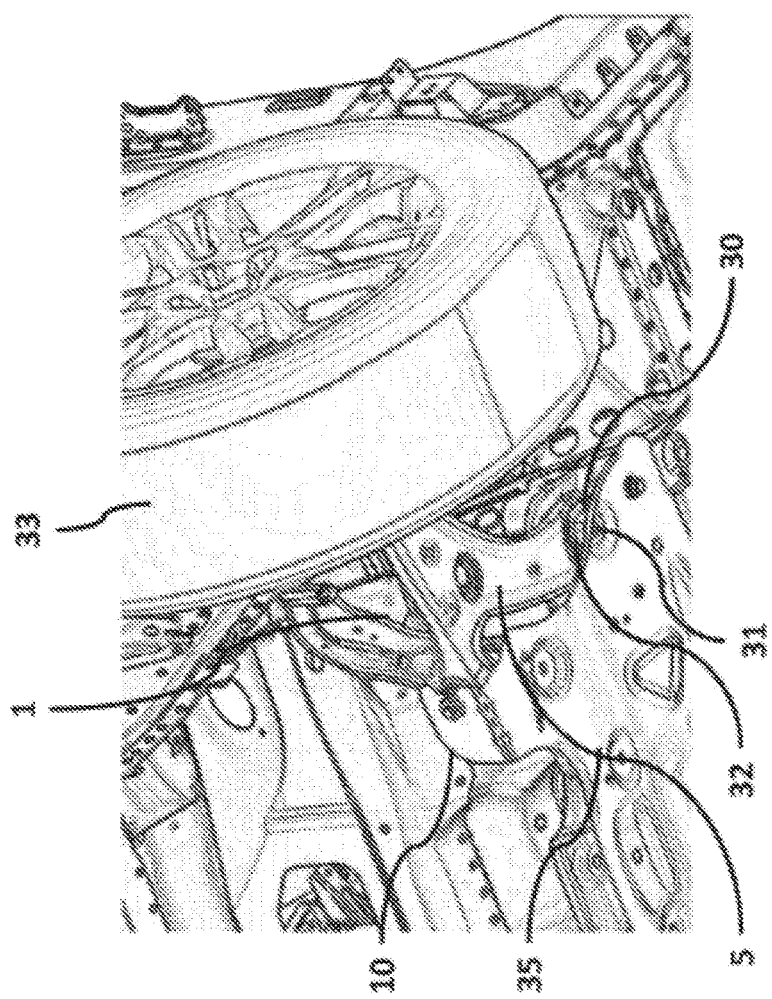
FIG. 3 illustrates one embodiment of the arrangement for attaching a control arm in a vehicle in an operational state.

FIG. 3 illustrates the arrangement 1 for attaching a control arm 5 in a vehicle from below in a view wherein the control arm 5 is arranged and attached in said vehicle. The control arm 5 is attached to a sub-frame 35 that is attached to the vehicle body. The front wheel 33 is attached to the suspension through the control arm 5 and other suspension components in accordance to what is well known to the person skilled in the art. The control arm 5 has two fastening points, one in the first attachment bracket 10 and one in the second attachment bracket 30. The first attachment bracket 10 comprises the slit 6 as previously described while the second attachment bracket 30 is designed to retain the rear portion of the control arm 5 in the event of a collision. The control arm 5 is attached to the second attachment bracket 30 through a second fastening means 31 extending through a second bushing 32.

Figure 4:
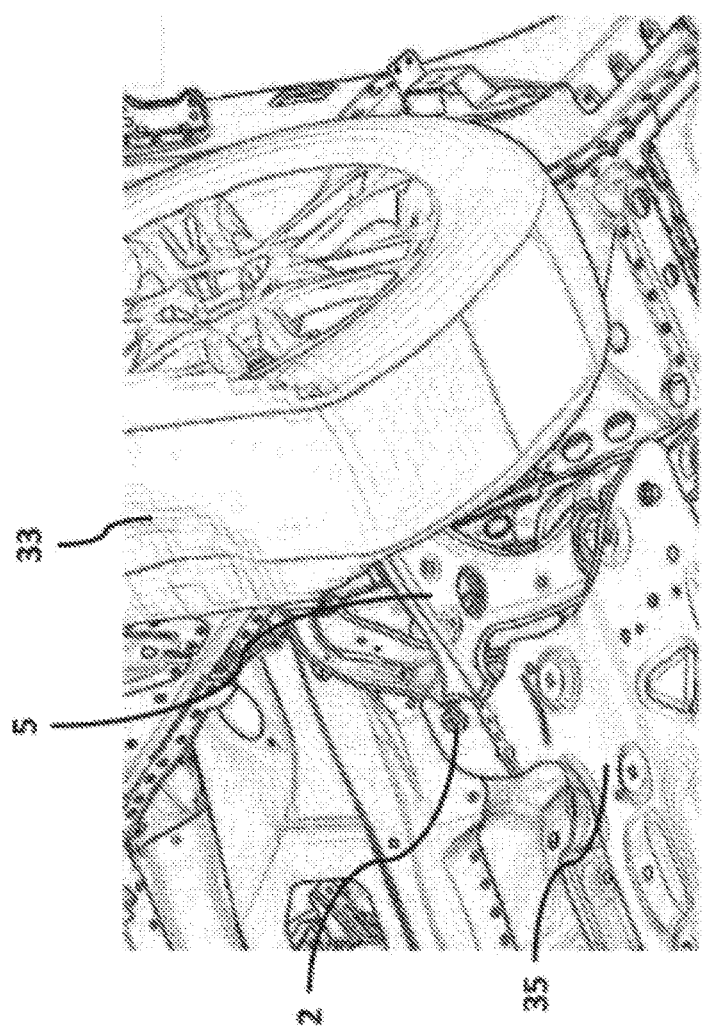
FIG. 4 illustrates one embodiment of the arrangement for attaching a control arm in a vehicle in a first state of an offset collision or small offset collision.

FIG. 4 illustrates the front of a vehicle in a first state of an offset collision wherein the collision is in an initial phase. It is illustrated how the front wheel 33 is slightly deformed while the arrangement 1 for attaching a control arm 5 in a vehicle still is intact.

Figure 5:
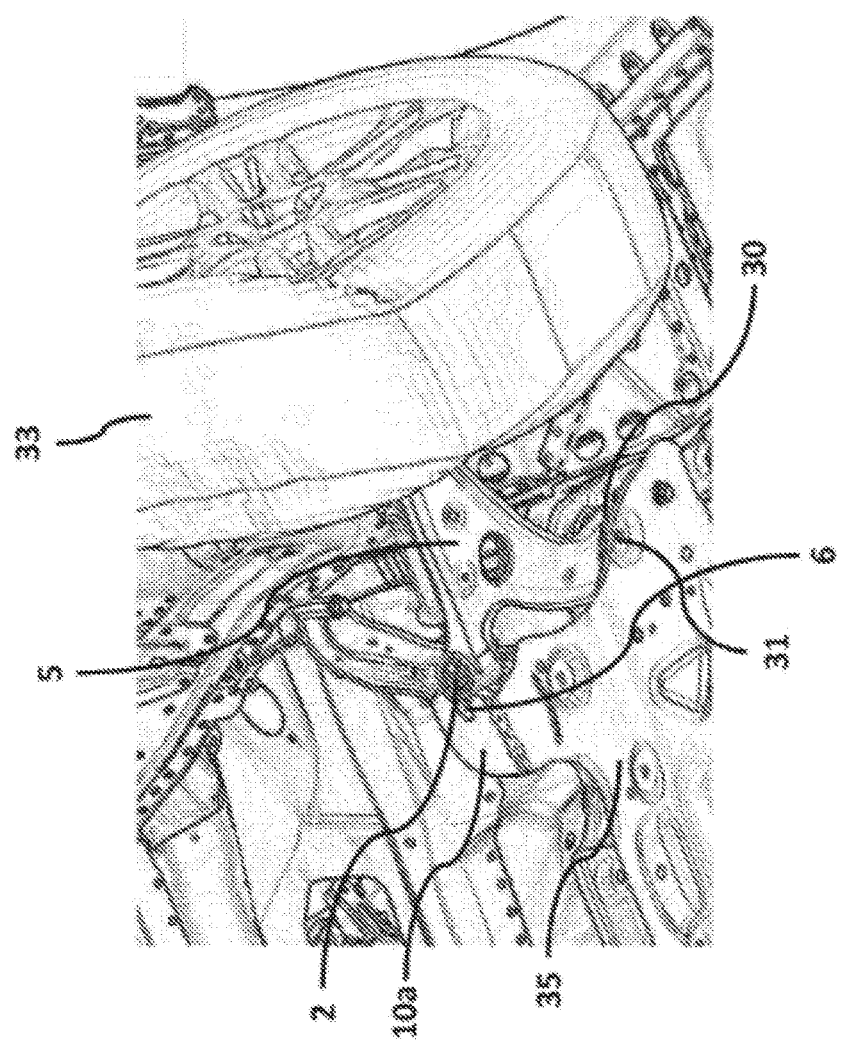
FIG. 5 illustrates one embodiment of the arrangement for attaching a control arm in a vehicle in a second state of a small offset collision.

FIG. 5 illustrates the front of a vehicle in a second state of a small offset collision. It is illustrated how the first fastening means 2 has detached from the first surface 10a through moving along the slit 6 that deforms and releases the first attachment means 2. The control arm 5 thereby has initiated a movement, mainly a rotation movement, wherein the front portion of the control arm 5 moves outwards and backwards. The second fastening means 31 attached to the second attachment bracket 30 is retained in position and thereby enables the rotation and control movement of the control arm 5. This enables that the front wheel 33 has the freedom of moving outwards from the engine bay through the rotation of the control arm around the second fastening means 31. The rotation of the control arm 5 further pushes the front wheel 33 outwards from the engine bay through that its angle changes.

Figure 6:
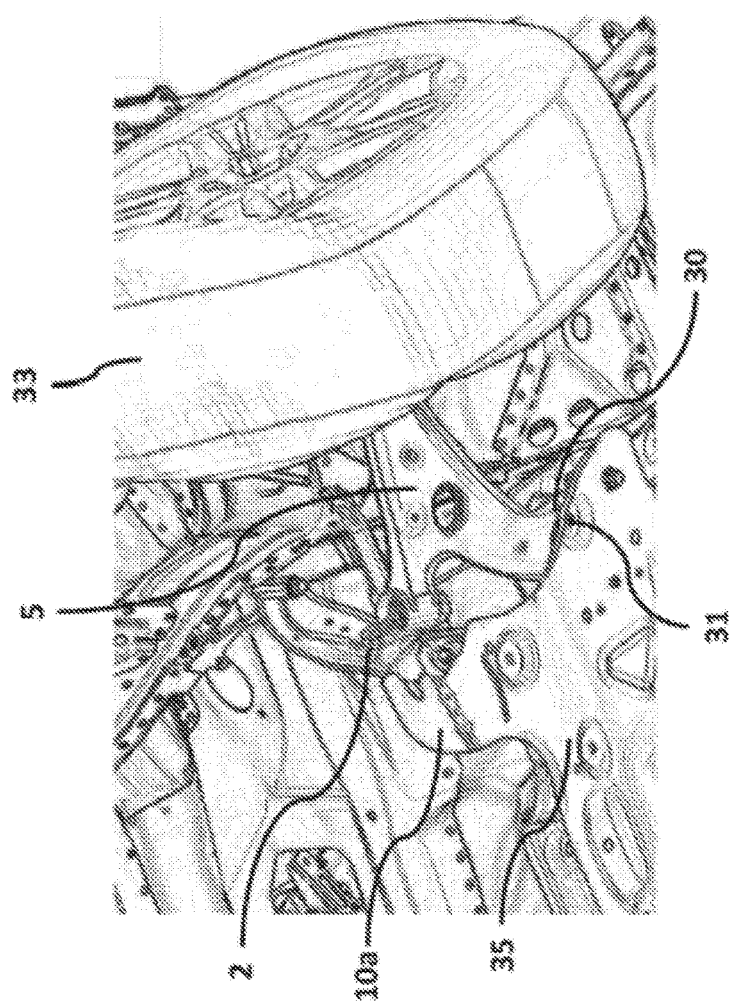
FIG. 6 illustrates one embodiment of the arrangement for attaching a control arm in a vehicle in a third state of a small offset collision.

FIG. 6 illustrates the front of a vehicle in a third state of a small offset collision wherein the control arm 5 has rotated further than in FIG. 5. The front portion of the control arm 5 is in this state completely decoupled from the first attachment bracket 10 while being retained in the second attachment bracket 30 by the second fastening means 31. FIG. 6 further illustrates how the front wheel 33 has started to rotate around its center towards a direction transversal of the vehicle's travel direction (outwards away from the engine bay).

Figure 7:
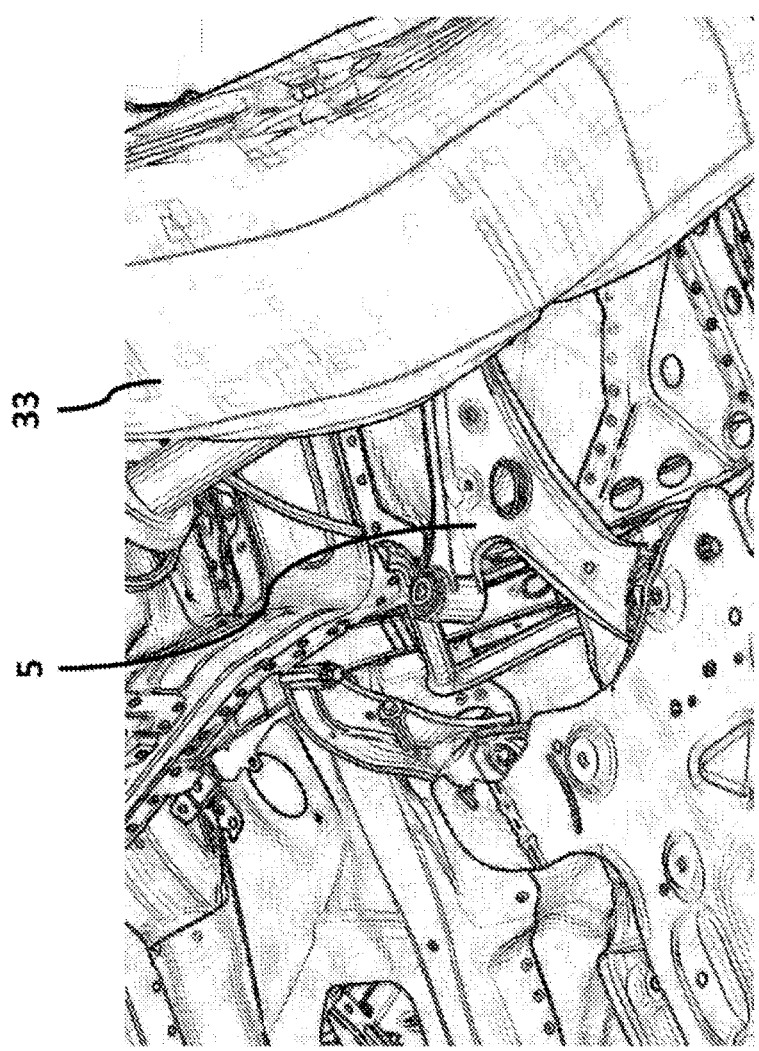
FIG. 7 illustrates one embodiment of the arrangement for attaching a control arm in a vehicle in a fourth state of a small offset collision.

FIG. 7 illustrates the front of a vehicle in a fourth state of a small offset collision wherein the rotation of the control arm 5 and the front wheel 33 is illustrated as a step in the progression of the collision wherein the vehicle is deformed.

Figure 8:
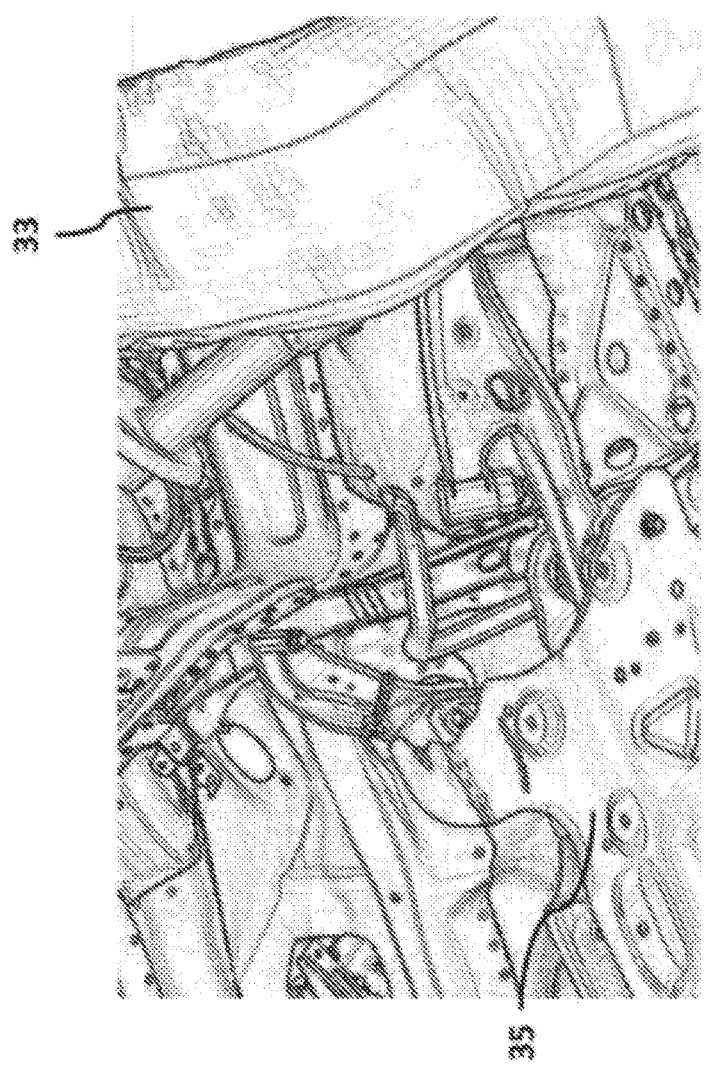
FIG. 8 illustrates one embodiment of the arrangement for attaching a control arm in a vehicle in a fifth state of a small offset collision.

FIG. 8 illustrates the front of a vehicle in a fifth state of a small offset collision wherein the rotation of the control arm 5 and the front wheel 33 is illustrated as a step in the progression of the collision wherein the vehicle is deformed. FIG. 8 further illustrates how in one embodiment the control arm 5 starts to deform, despite its structural strength, during the progression of the collision wherein the vehicle is deformed.

Figure 9:
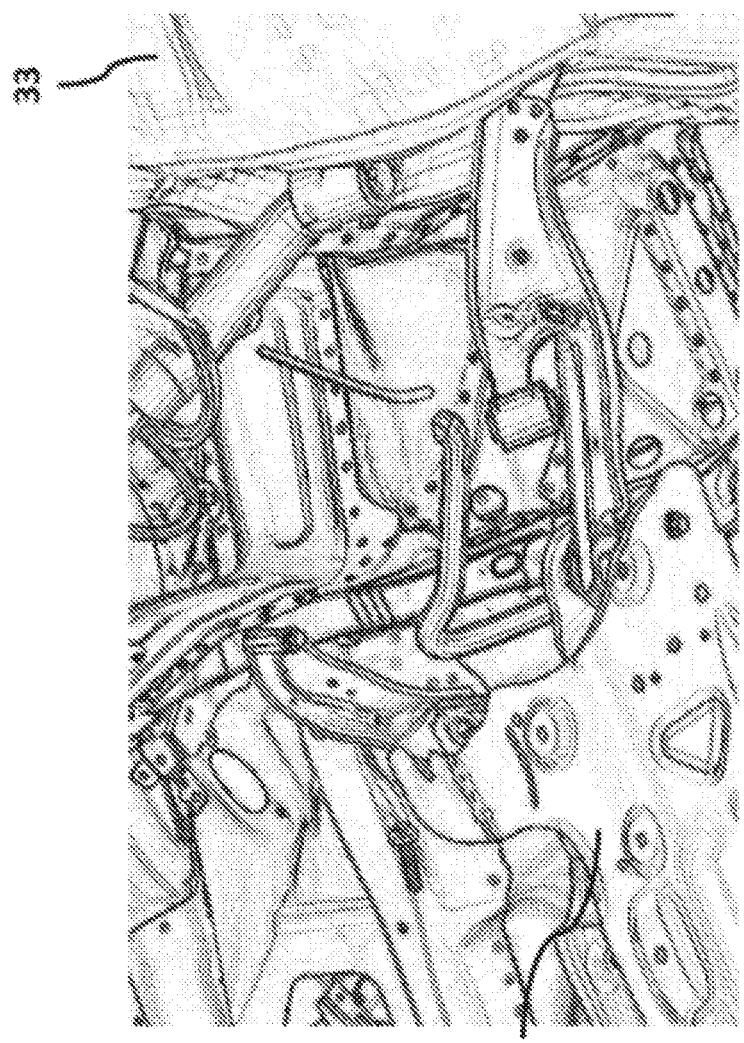
FIG. 9 illustrates one embodiment of the arrangement for attaching a control arm in a vehicle in a final state of a small offset collision, wherein the front wheel of the vehicle is located substantially outside of the boundaries of the vehicle body.

FIG. 9 illustrates the front of a vehicle in the final state of a small offset collision wherein the front wheel 33 of the vehicle is located substantially outside of the boundaries of the vehicle body.

Figure 10:
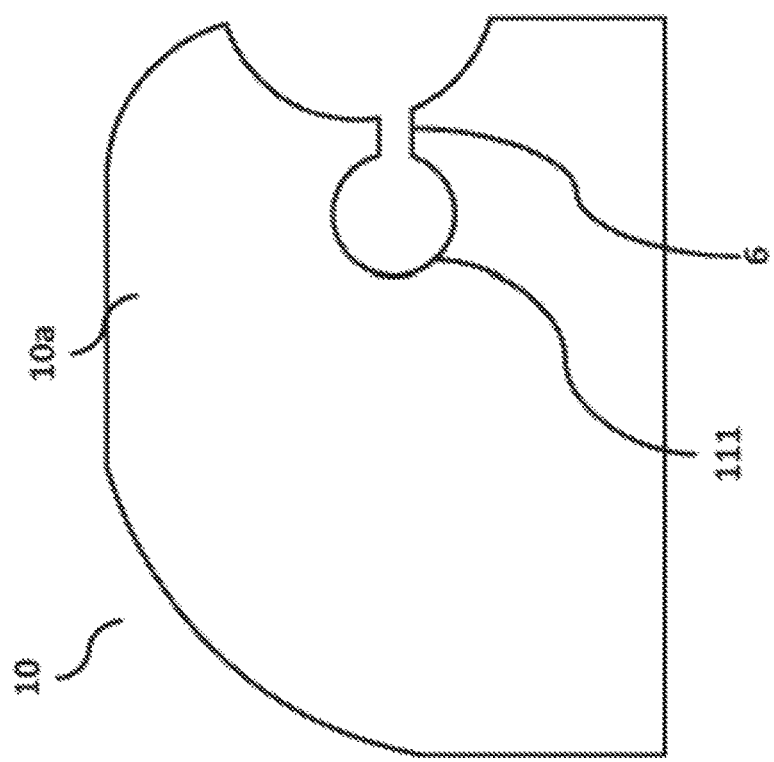
FIG. 10 illustrates one embodiment of a first attachment bracket.

FIG. 10 illustrates the first attachment bracket 10 from a perspective wherein the first surface 10a is visible. The first surface comprises a slit 6 extending from the edge of the first surface 10a to an aperture 111 which is adapted to receive a first attachment means 2. In one embodiment is the attachment bracket 10 part of a sub-frame 35, in another embodiment is only the first surface 10a part of a sub-frame 35 and the second surface 10b is a standalone component adapted to be arranged to the sub-frame 35.

Figure 11:
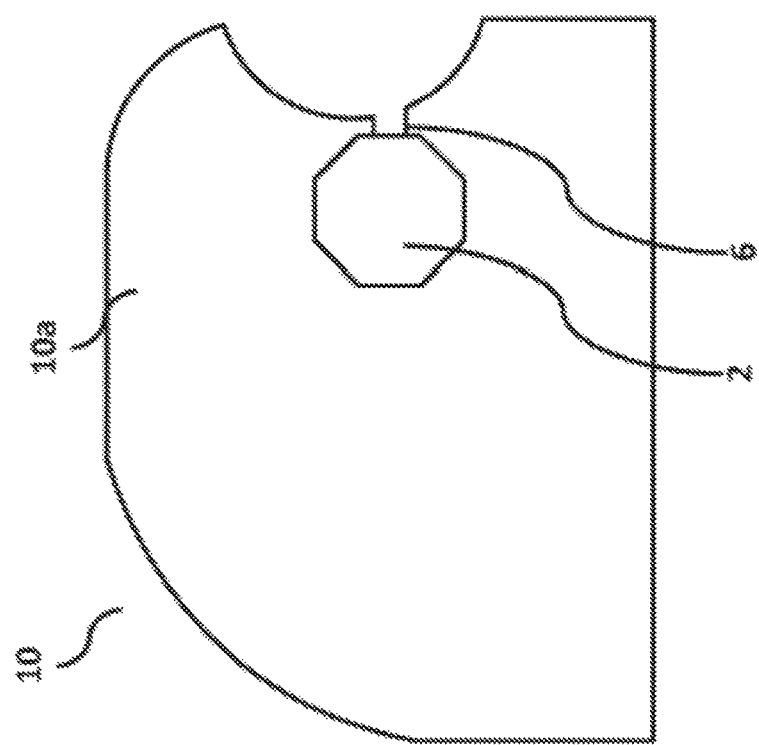
FIG. 11 illustrates one embodiment of a first attachment bracket comprising a first attachment means.

FIG. 11 illustrates the first attachment bracket 10 with the first fastening means 2 arranged in the aperture 111. FIG. 11 further illustrates how the fastening means 2 is arranged during operation of the vehicle and when no crash has occurred. I.e. in an operational state of the vehicle.

FIG. 11 further illustrates a state corresponding to FIG. 3, i.e. an operational state of the vehicle. The material in the first surface 10a comprises sufficient structural strength to maintain the first fastening means 2 in its position in the aperture 111 during normal operation of the vehicle.

Figure 12:
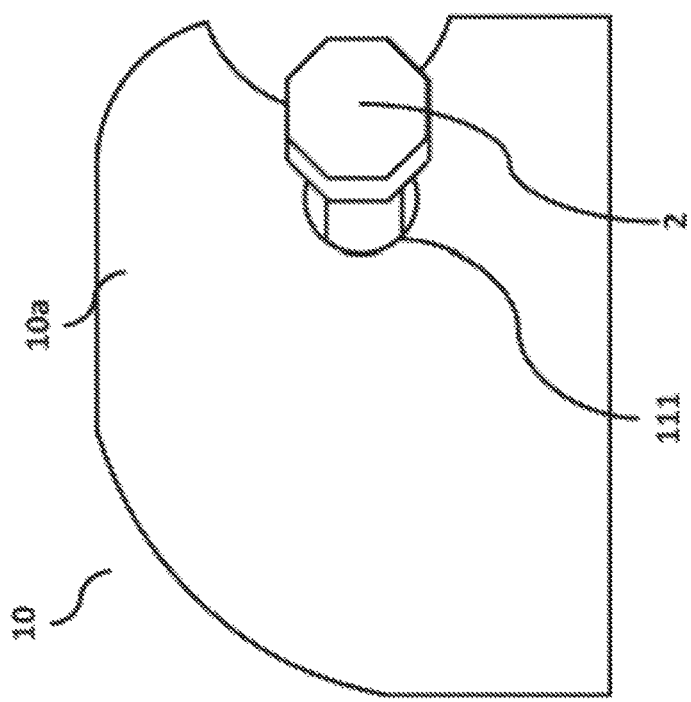
FIG. 12 illustrates one embodiment wherein functionality of the slit is illustrated through showing what happens with the first fastening means in relation to the first attachment bracket during a small offset collision.

FIG. 12 illustrates the first attachment bracket 10 and the first fastening means 2 in a second state of a small offset collision. The state corresponds to the state as described in FIGS. 4-5. It is illustrated how the first fastening means 2 has detached from the first surface 10a through moving along the slit 6, how the slit 6 has deformed during this process, and how the first surface 10a releases the first attachment means 2.

Figure 13:
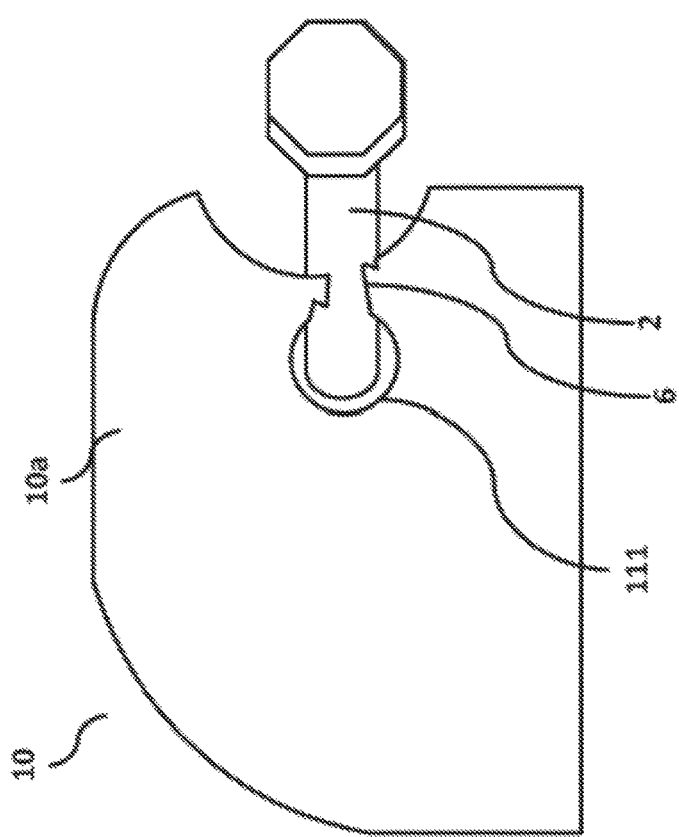
FIG. 13 illustrates one embodiment wherein functionality of the slit is illustrated through showing what happens with the first fastening means when it completely detach in relation to the first attachment bracket during a small offset collision.

FIG. 13 illustrates the first attachment bracket 10 and the first fastening means 2 in a third state of a small offset collision. The state of FIG. 13 corresponds to the state as described in FIG. 4-5. The person skilled in the art understands that the FIGS. 10-13 illustrates a simplified view of the arrangement 1 for fastening a control arm 5 in a vehicle wherein multiple components has been removed from the visual illustration of the invention.

FIG. 13 further illustrates how the slit 6 has been deformed during the movement of the first fastening means 2.

Figure 14:
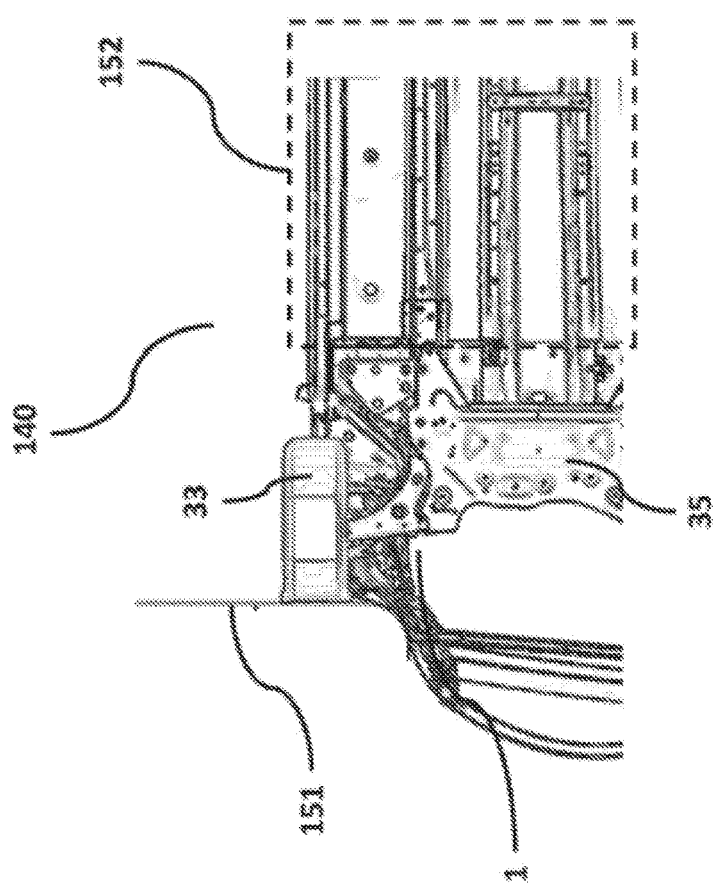
FIG. 14 illustrates one embodiment of the arrangement for attaching a control arm in a vehicle wherein the vehicle with a passenger cell is illustrated from underneath in the initial first phase of a small offset collision.

FIG. 14 illustrates the arrangement 1 for attaching a control arm 5 in a vehicle 140 in an initial state of a small offset collision with a small offset collision impact object 151. The state corresponds generally to the state as described in FIG. 4. The crash has deformed parts of the front region of the vehicle 140 and the wheel 33 is just affected. The sub-frame 35 is in one embodiment of this stage substantially unaffected.

Figure 15:
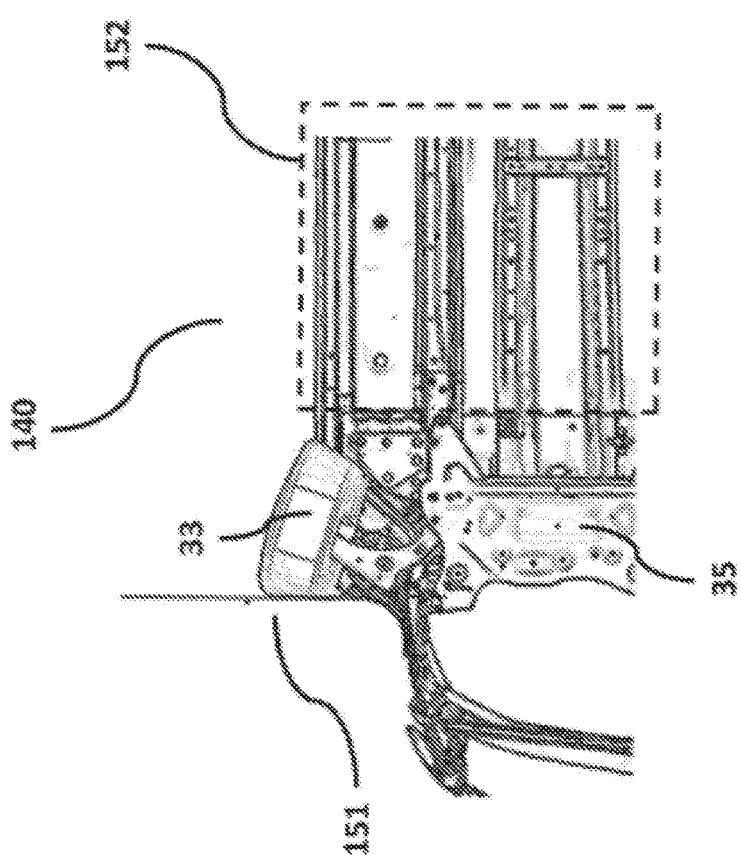
FIG. 15 illustrates one embodiment of the arrangement for attaching a control arm in a vehicle wherein the vehicle with a passenger cell is illustrated from underneath in a second phase of a small offset collision.

FIG. 15 illustrates the arrangement 1 for attaching a control arm 5 in a vehicle 140 in a second state of a small offset collision. The small offset collision impact object 151 has in this state moved further into the structure of the vehicle 140. The control arm 5 has completely detached from the first attachment bracket 10 and has begun to rotate in the second attachment bracket 30. As illustrated is the front wheel moving towards the outer boundaries of the passenger cell 152.

Figure 16:
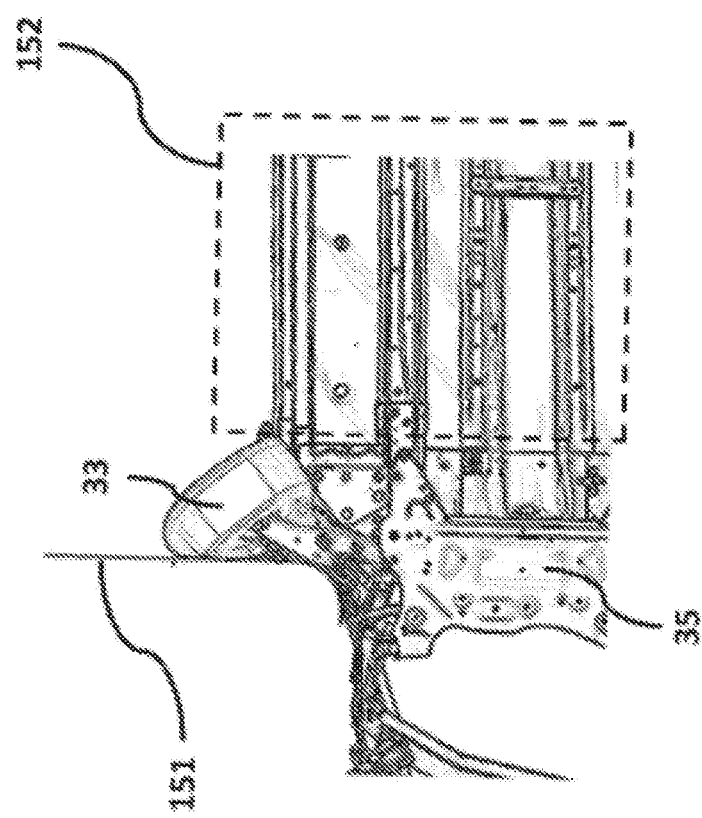
FIG. 16 illustrates one embodiment of the arrangement for attaching a control arm in a vehicle wherein the vehicle with a passenger cell is illustrated from underneath in a third phase of a small offset collision.

FIG. 16 illustrates the arrangement 1 for attaching a control arm 5 in a vehicle 140 in a second state of a small offset collision. The small offset collision impact object 151 has in this state moved even further into the structure of the vehicle 140 and is approaching the end of the deformation zones. The aim is to maintain the structural integrity of the passenger cell 152 while absorbing as much of the energy as possible. As illustrated on FIG. 16 is the wheel 33 directed outside of the passenger cell 152.

Figure 17:
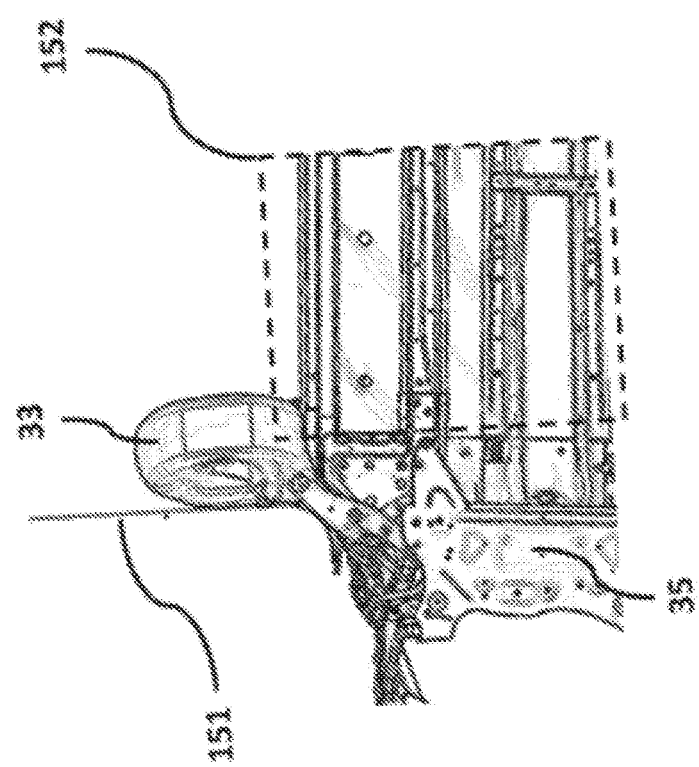
FIG. 17 illustrates one embodiment of the arrangement for attaching a control arm in a vehicle wherein the vehicle with a passenger cell is illustrated from underneath in a final phase of a small offset collision, wherein the front wheel is substantially outside of the boundaries of the vehicle body.

FIG. 17 illustrates a final stage of a collision. The person skilled in the art understands that the movement of the front wheel 33 after this stage is outside of the intended use of the arrangement.

What is claimed is:

1. An arrangement for attaching an A-arm shaped control arm in a vehicle, wherein said arrangement comprises:
    the control arm provided with a first fastening point and a second fastening point to a vehicle sub-frame;
    a first attachment bracket at the sub-frame being the first fastening point for the control arm, a first fastener, and a first bushing, said first bushing is arranged in an opening of the control arm, the first fastener is passing through both the first attachment bracket and the first bushing;
    a second attachment bracket and a second fastener at the sub-frame being the second fastening point for the control arm, said second fastener to retain a rear portion of the control arm in the event of a collision, characterized in that:
    the control arm rotates around a rotation axis centered in the center of the second fastener; and
    said first attachment bracket comprises a slit arranged transverse to the travel direction of the vehicle, the slit is arranged in a first surface of the first attachment bracket, wherein the first attachment bracket is adapted to release the first fastener of said control arm when a predetermined force is exceeded during the collision.

2. The arrangement for attaching a control arm in a vehicle according to claim 1, wherein the first attachment bracket is adapted to release engagement of the first fastener at a first collision force substantially lower than a second collision force required for the second attachment bracket to release the second fastener.

3. The arrangement for attaching a control arm in a vehicle according to claim 2, wherein said first attachment bracket further comprises a second surface substantially parallel to said first surface, the first fastener is arranged within an aperture adjacent to said slit of the first surface and in fixed engagement to engage said second surface.

4. The arrangement for attaching a control arm in a vehicle according to claim 3, wherein the first attachment bracket is arranged as part of a front portion of the vehicle sub-frame.

5. The arrangement for attaching a control arm in a vehicle according to claim 4, wherein the second attachment bracket is arranged as part of a rear portion of the vehicle sub-frame.

6. The arrangement for attaching a control arm in a vehicle according to claim 1, wherein said first and second fasteners are chosen from a bolt, screw, rivet, pin, and peg.

7. The arrangement for attaching a control arm in a vehicle according to claim 1, wherein said first attachment bracket further comprises a second surface substantially parallel to said first surface, the first fastener is arranged within an aperture adjacent to said slit of the first surface and is engaged with said second surface.

8. The arrangement for attaching a control arm in a vehicle according to claim 7, wherein a portion of the first fastener is adapted to deform proximate to the second surface during an exerted force of the collision.

9. The arrangement for attaching a control arm in a vehicle according to claim 1, wherein the first attachment bracket is arranged as part of a front portion of the vehicle sub-frame.

10. The arrangement for attaching a control arm in a vehicle according to claim 1, wherein the second attachment bracket is arranged as part of a rear portion of the vehicle sub-frame.

11. The arrangement for attaching a control arm in a vehicle according to claim 10, wherein the second attachment bracket is arranged as part of the vehicle sub-frame at a position further back in relation to a traveling direction of said vehicle than the first attachment bracket.

12. Method for directing a vehicle front wheel outside of a passenger cell during a collision wherein an A-arm shaped control arm is attached through an arrangement for attaching the control arm in a vehicle, wherein said arrangement comprises:
the control arm provided with a first fastening point and a second fastening point to a vehicle sub-frame;
a first attachment bracket at the sub-frame being the first fastening point for the control arm, a first fastener, and a first bushing, said first bushing is arranged in an opening of the control arm, the first fastener is passing through both the first attachment bracket and the first bushing;
a second attachment bracket and a second fastener at the sub-frame being the second fastening point for the control arm, said second fastener designed to retain a rear portion of the control arm in the event of the collision, characterized in that:
the control arm rotates around a rotation axis centered in the center of the second fastener, and in that said first attachment bracket comprises a slit arranged transversal to the travel direction of the vehicle, the slit is arranged in a first surface of the first attachment bracket, wherein the first attachment bracket is adapted to release the first fastener of said control arm when a predetermined force is exceeded during the collision, and wherein the method comprises the steps:
releasing said control arm from the first attachment bracket when an exerted force of the collision exceeds the predetermined force, and
retaining the attachment of the control arm to the second attachment bracket allowing the front wheel to be rotated outside of said passenger cell.

13. Method for directing a vehicle front wheel outside of a passenger cell during a collision according to claim 12, wherein the attachment of the control arm to the second attachment bracket allows the front wheel to be twisted outside of said passenger cell.

14. Method for directing a vehicle front wheel outside of a passenger cell during the collision according to claim 12, wherein the control arm is rotated around the rotation axis of the second fastener in the second attachment bracket during the collision.

15. A vehicle comprising:
an arrangement for attaching an A-arm shaped control arm in the vehicle, wherein said arrangement comprises:
the control arm provided with a first fastening point and a second fastening point to a vehicle sub-frame;
a first attachment bracket at the sub-frame being the first fastening point for the control arm, a first fastener, and a first bushing, said first bushing is arranged in an opening of the control arm, the first fastener is passing through both the first attachment bracket and the first bushing;
a second attachment bracket and a second fastener at the sub-frame being the second fastening point for the control arm, said second fastener designed to retain a rear portion of the control arm in the event of a collision, characterized in that:
the control arm rotates around a rotation axis centered in the center of the second fastener; and
said first attachment bracket comprises a slit arranged transversal to the travel direction of the vehicle, the slit is arranged in a first surface of the first attachment bracket, wherein the first attachment bracket is adapted to release the first fastener of said control arm when a predetermined force is exceeded during the collision.

* * * * *